(12) United States Patent
Choi

(10) Patent No.: US 8,914,607 B2
(45) Date of Patent: *Dec. 16, 2014

(54) BROADCAST RECEIVING APPARATUS AND MEMORY MANAGING METHOD THEREOF

(75) Inventor: Young-ho Choi, Gunpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 450 days.

This patent is subject to a terminal disclaimer.

(21) Appl. No.: 13/078,505

(22) Filed: Apr. 1, 2011

(65) Prior Publication Data

US 2011/0314247 A1    Dec. 22, 2011

(30) Foreign Application Priority Data

Jun. 22, 2010  (KR) .............................. 2010-0059035

(51) Int. Cl.
  *G06F 12/00* (2006.01)
  *H04N 21/443* (2011.01)
  *G06F 9/50* (2006.01)
  *H04N 5/44* (2011.01)
  *H04N 21/426* (2011.01)

(52) U.S. Cl.
  CPC ............. *H04N 5/44* (2013.01); *H04N 21/4435* (2013.01); *G06F 9/5016* (2013.01); *H04N 21/443* (2013.01); *H04N 21/42692* (2013.01)
  USPC ......................................................... 711/173

(58) Field of Classification Search
  None
  See application file for complete search history.

(56) References Cited

U.S. PATENT DOCUMENTS

| | | | |
|---|---|---|---|
| 6,049,854 A * | 4/2000 | Bedarida ....................... 711/153 |
| 6,408,313 B1 | 6/2002 | Campbell et al. |
| 2002/0129172 A1* | 9/2002 | Baskey et al. ................. 709/310 |
| 2002/0184484 A1* | 12/2002 | Abboud et al. ............... 713/100 |
| 2006/0149906 A1 | 7/2006 | Misra |
| 2008/0222380 A1 | 9/2008 | Sze et al. |
| 2010/0262727 A1* | 10/2010 | Arndt .............................. 710/22 |

OTHER PUBLICATIONS

Communication dated Mar. 21, 2014, issued by European Patent Office in counterpart European Application No. 11170563.8.
Rath, K. et al., "Set-Top Box Control Software: A Key Component in Digital Video", Philips Journal of Research, vol. 50, No. 1/2, Jan. 1, 1996, pp. 185-199.

* cited by examiner

*Primary Examiner* — Brian Peugh
(74) *Attorney, Agent, or Firm* — Sughrue Mion, PLLC

(57) ABSTRACT

A broadcast receiving apparatus and memory managing method thereof are provided. The broadcast receiving apparatus includes a storage unit which includes a plurality of memory areas for each of a plurality of operating systems, a determination unit which periodically determines a retrievable memory area for each of the plurality of memory areas, and a controller which reallocates at least part of the retrievable memory area, if memory area reallocation is necessary.

16 Claims, 10 Drawing Sheets

BROADCAST RECEIVING APPARATUS AND MEMORY MANAGING METHOD THEREOF

CROSS-REFERENCE TO RELATED APPLICATION

This application claims priority from Korean Patent Application No. 10-2010-0059035, filed on Jun. 22, 2010, in the Korean Intellectual Property Office, the disclosure of which is incorporated herein by reference in its entirety.

BACKGROUND

1. Field

Methods and apparatuses consistent with the exemplary embodiments relate to a broadcast receiving apparatus and a memory managing method thereof, and more particularly, to a broadcast receiving apparatus which can provide a high speed response by adaptively allocating a memory, and a memory managing method thereof.

2. Description of the Related Art

A broadcast receiving apparatus, which is an apparatus for receiving a digital broadcast, converts a digital broadcast signal or an analog broadcast signal transmitted from a broadcasting station, and video and audio signals input from various external apparatuses, such as a video player, a digital versatile disk (DVD) player, and a Blue-ray disk player, into a transport stream (TS) signal, and displays the TS signal or transmits the TS signal to an external display apparatus. A representative example of such a broadcast receiving apparatus includes a digital television, an internet protocol television (IPTV) using video on demand (VOD), and a set-top box.

As broadcast receiving apparatuses have been rapidly developing, these apparatuses have reached a performance equivalent to that of a personal computer (PC). Thus, broadcast receiving apparatuses are able to provide numerous services, like PCs currently provide.

However, broadcast receiving apparatuses should utilize insufficient resource as efficiently as possible in contrast with the PC, and should protect its own unique function from other services. Considering this aspect of the broadcast receiving apparatus, applying services on the PC may result in a serious problem that affects security and stability.

In order to solve this problem, a recent broadcast receiving apparatus classifies services into a basic service such as a service provided by a digital TV and an additional service such as a service provided by a PC, and provides the classified services using different operating systems.

However, considering that the performance of an operating system depends on an amount of available memory, it is important to determine the size of each memory to be allocated to each operating system when a plurality of operating systems operate in a single hardware apparatus.

However, since the memories are allocated to the plurality of operating systems without considering priorities given to the operating systems in the related art, there is a problem that if 'an operating system for providing an additional service' uses much memory preferentially, 'an operating system for providing a video service' may malfunction.

SUMMARY

An aspect of an exemplary embodiment provides a broadcast receiving apparatus which can provide a high speed response by adaptively allocating a memory, and a memory managing method thereof.

According to an aspect of an exemplary embodiment, a method for managing a memory of a broadcast receiving apparatus which uses a plurality of operating systems, includes: allocating a plurality of memory areas to the plurality of operating systems, periodically determining a retrievable memory area for each of the plurality of allocated memory areas, and reallocating at least part of the retrievable memory area if memory area reallocation is necessary.

The determining may include checking a size of a memory that is used by each operating system in each of the plurality of allocated memory areas, and determining the retrievable memory area based on the determined size of the memory.

The determining may include managing the retrievable memory area as a clean list.

The reallocating may include reallocating at least part of the retrievable memory area based on a change in the size of the memory.

The plurality of operating systems may include a first operating system and a second operating system, and the first operating system may be used for providing a basic service of the broadcast receiving apparatus and the second operating system may be used for providing an additional service provided by the broadcast receiving apparatus.

The determining may include periodically determining a retrievable memory for a memory area corresponding to the second operating system, and the reallocating may include reallocating the retrievable memory area corresponding to the second operating system to the first operating system, if the first operating system lacks a memory.

The reallocating may include reallocating a retrievable memory area of the second operating system that corresponds to a memory size of the first operating system to the first operating system.

The reallocating may include reallocating the retrievable memory area by giving priority to a memory area corresponding to the first operating system over a memory area corresponding to the second operating system.

According to an aspect of another exemplary embodiment, a broadcast receiving apparatus which uses a plurality of operating systems, includes: a storage unit which includes a plurality of memory areas for each of the plurality of operating systems, a determination unit which periodically determines a retrievable memory area for each of the plurality of memory areas, and a controller which reallocates at least part of the retrievable memory area, if memory area reallocation is necessary.

The determination unit may check a size of a memory that is used by each operating system in each of the plurality of memory areas, and may determine the retrievable memory area based on the determined size of the memory.

The determination unit may manage the retrievable memory area as a clean list.

The controller may reallocate at least part of the retrievable memory area based on a change in the size of the memory.

The plurality of operating systems may include a first operating system and a second operating system, and the first operating system may be used for providing a basic service of the broadcast receiving apparatus and the second operating system may be used for providing an additional service provided by the broadcast receiving apparatus.

The determination unit may periodically determine a retrievable memory area for a memory area corresponding to the second operating system, and the controller may reallocate the retrievable memory area corresponding to the second operating system to the first operating system, if the first operating system lacks a memory.

The controller may reallocate a retrievable memory area of the second operating system that corresponds to a memory size of the first operating system to the first operating system.

The controller may reallocate the retrievable memory area by giving priority to a memory area corresponding to the first operating system over a memory area corresponding to the second operating system.

Additional aspects of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings in which.

DETAILED DESCRIPTION OF THE EXEMPLARY EMBODIMENTS

Figure 1:
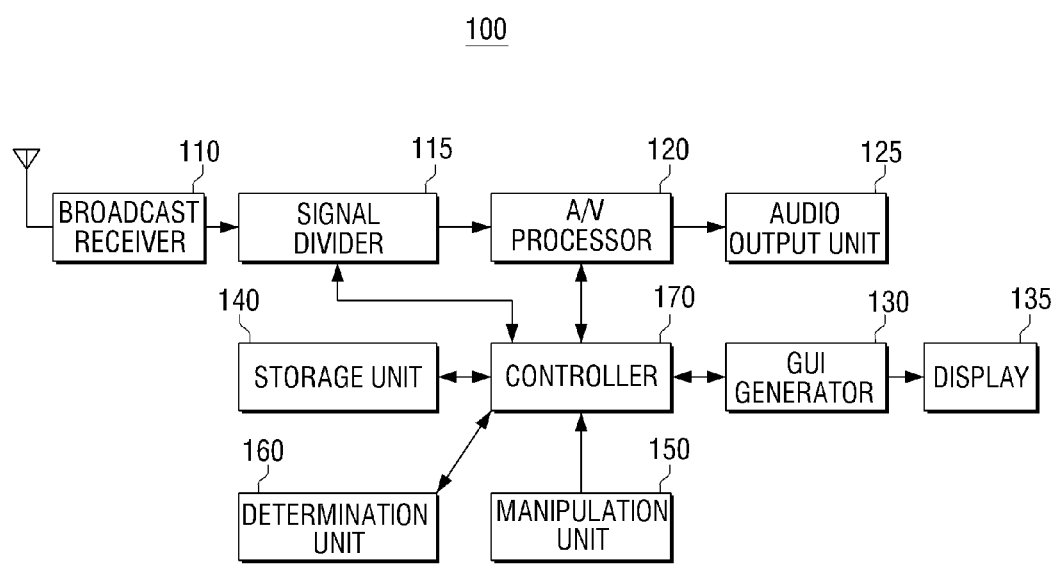
FIG. 1 is a block diagram illustrating a broadcast receiving apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

FIG. 1 is a block diagram illustrating a broadcast receiving apparatus according to an exemplary embodiment. In this exemplary embodiment, operating systems (or imaginary machines, hereinafter referred to as "operating system") used in the broadcast receiving apparatus 100 are limited to a first operating system (or a main operating system) and a second operating system (a sub-operating system), for convenience of explanation. However, the broadcast receiving apparatus of the exemplary embodiment may contain more than two operating systems.

The first operating system is an operating system that is used for providing a basic service of the broadcast receiving apparatus 100, whereas the second operating system is an operating system that is used for providing an additional service.

The basic service may include a service for replaying a broadcast signal corresponding to a tuned channel or a video signal corresponding to a selected image, which is an original function of the broadcast receiving apparatus 100, or refers to a service that is initially installed in the broadcast receiving apparatus 100 by the manufacturer of the broadcast receiving apparatus 100. The additional service may include a service that is provided by the broadcast receiving apparatus 100 in addition to the above basic service, such as accessing the Internet or games, or a service that is installed in the broadcast receiving apparatus 100 by the user.

Referring to FIG. 1, the broadcast receiving apparatus 100 according to an exemplary embodiment includes a broadcast receiver 110, a signal divider 115, an audio/video (A/V) processor 120, an audio output unit 125, a graphic user interface (GUI) generator 130, a display 135, a storage unit 140, a manipulation unit 150, a determination unit 160, and a controller 170.

The broadcast receiver 110 receives a broadcast signal from a broadcasting station or a satellite in a wired or wireless manner and tunes to the broadcast.

The signal divider 115 divides a broadcast signal into a video signal, an audio signal, and an additional information signal. The signal divider 115 transmits the video signal and the audio signal to the A/V processor 120.

The A/V processor 120 performs signal-processing such as video decoding, video scaling, and audio decoding with respect to the video signal and the audio signal input from the broadcast receiver 110 and the storage unit 140. The A/V processor 120 outputs the video signal to the GUI generator 130 and outputs the audio signal to the audio output unit 125.

On the other hand, if the storage unit 140 stores the received audio and video signals, the A/V processor 120 may output video and audio content in a compressed format to the storage unit 140.

The audio output unit 125 converts the audio signal output from the A/V processor 120 into sound and outputs the sound through a speaker (not shown) or outputs it to an external apparatus through an external output terminal (not shown).

The GUI generator 130 generates a GUI to be provided to the user. The GUI generator 130 adds the generated GUI to the image output from the A/V processor 120. The display 135 displays the GUI-added image.

The storage unit 140 includes a plurality of memory areas for a plurality of operating systems. Specifically, the storage unit 140 includes a first memory area for providing the basic service of the broadcast receiving apparatus 100 and a second memory area for providing the additional service of the broadcast receiving apparatus 100.

The first memory area is a memory area allocated to be used by the first operating system for providing the basic service, and the second memory area is a memory area allocated to be used by the second operating system for providing the additional service.

An example of the basic service may be a service for replaying a broadcast signal or a video signal, which is an original function of the broadcast receiving apparatus 100, and an example of the additional service may be a service for providing a $3^{rd}$ party application such as a game and a web-browser.

The storage unit 140 may store image contents. Specifically, the storage unit 140 may receive image contents in which audio and video are compressed from the A/V processor 120 and store the image contents, and may output the stored image contents to the A/V processor 120 under the control of the controller 170. The storage unit 140 may be realized as a hard disk, a non-volatile memory, or a volatile memory.

The manipulation unit 150 may be realized, for example, as a touch screen, a touch pad, a key button, or a key pad to provide a user's manipulation on the broadcast receiving apparatus 100. Specifically, the user uses the manipulation unit 150 to set the broadcast receiving apparatus 100 to provide the basic service or the additional service only, or to provide both the basic service and the additional service. The manipulation unit 150 transmits a basic service execution command or an additional service execution command corresponding to the user's determination to the controller 170, which will be described later.

The determination unit 160 determines a size of a memory used by each operating system. Specifically, the determination unit 160 checks a working set size (WSS) of each operating system periodically, thereby determining a size of a memory used by each operating system. The WSS refers to an amount of memory actually used by each operating system. In other words, the determination unit 160 checks the WSS of the first operating system, thereby determining a memory area actually used by the first operating system out of the first memory area allocated to the first operating system. The determination unit 160 checks the WSS of the second operating system, thereby determining a memory area actually used by the second operating system out of the second memory area allocated to the second operating system.

The determination unit 160 determines a retrievable memory area based on the size of the used memory. Specifically, the determination unit 160 determines the retrievable memory area by subtracting the used memory area from the memory area allocated to each operating system. For example, the determination unit 160 determines a retrievable memory area for the second operating system by subtracting the WSS of the second operating system from the second memory area allocated to the second operating system.

Also, the determination unit 160 may manage the retrievable memory area as a clean list. The clean list refers to a list of memory pages that can be assigned to another operating system from a memory area used by an operating system. That is, the clean list refers to a list of memory pages that do not become dirty.

The determination unit 160 may manage the retrievable memory area for the second operating system to be greater than a predetermined size. Specifically, the determination unit 160 may manage the retrievable memory area for the second operating system to be equal to or greater than the amount of additional memory required by the first operating system.

Since the clean list for the retrievable memory area is prepared in advance as described above, delay which may occur due to processes of examining a page cache and determining whether the page has a dirty page or not when memory needs to be retrieved can be avoided. Specifically, if a memory needs to be reallocated in a related-art method, all of the page caches should be examined and it should be determined whether the page has a dirty page or not, and swap-out/disk flushing should be performed. Therefore, delay in retrieving the memory occurs. However, according to an exemplary embodiment, since the list of the retrievable memories can be recognized in advance, the memory can be retrieved more quickly.

The controller 170 controls an overall operation of the broadcast receiving apparatus 100 and allocates a memory area to each of the plurality of operating systems. Specifically, the controller 170 may allocate the memory area to the plurality of operating systems when the broadcast receiving apparatus 100 initially operates or when the plurality of operating systems operate in response to a user's manipulation or occurrence of an event. The controller 170 may allocate the memory area to each of the plurality of operating systems according to a predetermined size or a predetermined algorithm. For example, if the broadcast receiving apparatus 100 operates with two operating systems, the controller 170 may allocate 50% of the memory area to the first operating system and may allocate the remaining 50% of the memory area to the second operating system.

Also, the controller 170 determines whether it is necessary to reallocate the memory area. Specifically, the controller 170 checks the WSS of each operating system and determines that it is necessary to reallocate the memory area when the WSS gets close to the size of the memory allocated to each operating system. For example, if the WSS occupies between 80% and 100% of the size of the memory allocated to the first operating system, the controller 170 determines to reallocate the memory area.

The controller 170 reallocates at least part of the retrievable memory area. Specifically, the controller 170 reallocates the retrievable memory area of the memory area allocated to an operating system to another operating system which requires a memory additionally. For example, if an amount of memory necessary for the first operating system increases, the retrievable memory area of the second memory area allocated to the second operating system may be reallocated to the first operating system.

At this time, the controller 170 may reallocate the entire retrievable memory area of the second operating system to the first operating system or may reallocate a portion of the retrievable memory area to the first operating system according to the number of allocated memory pages of the first operating system. Also, the controller 170 may reallocate a portion of the retrievable area of the second operating system to the first operating system up to the size of the first memory area. The operation of reallocating the memory by the controller 170 will be explained later with reference to FIG. 10.

The controller 170 may reallocate the memory area according to a priority given to each of the operating systems. Specifically, if the memory needs to be reallocated to an operating system of a low priority relative to a priority of another operating system, the controller 170 may reallocate only the retrievable memory area to the operating system requiring an additional memory area, without affecting an operation of an operating system with a higher priority, so that the broadcast receiving apparatus 100 can be prevented from failing to perform the basic service such as replaying a broadcast signal. For example, if the memory needs to be reallocated to the second operating system, the controller 170 may reallocate the retrievable memory area of the first operating system to the second memory area without affecting the operation of the first operating system or may not reallocate in order not to affect the operation of the first operating system.

Also, since the broadcast receiving apparatus 100 manages the retrievable memory area as a clean list in advance before the memory needs to be reallocated, the memory can be reallocated in a timely manner.

Also, since the memory is reallocated according to the priority of the operating system, even if the second operating system performs a job that requires much memory, the performance of first operating system does not deteriorate and the first operating system is prevented from malfunctioning in providing a service.

FIGS. 2 to 6 are views to explain various methods for allocating the memory according to an exemplary embodiment.

Figure 2:
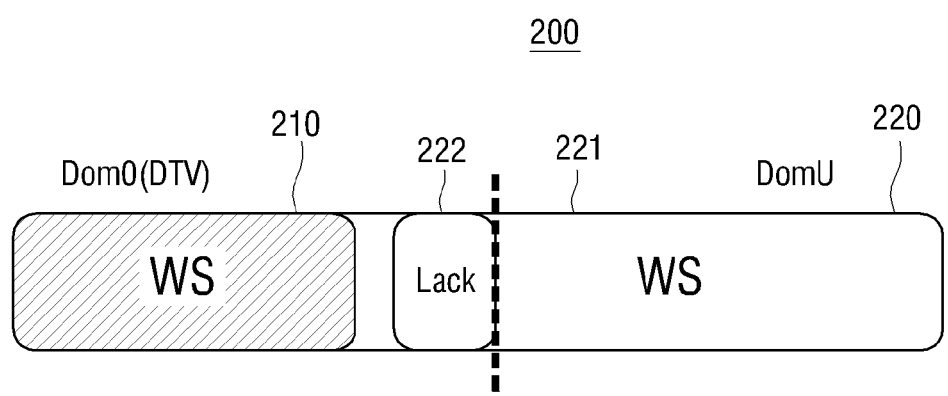
FIGS. 2 to 6 are views to explain various methods for allocating a memory according to an exemplary embodiment.

More specifically, FIG. 2 illustrates an example in which static memory allocation is applied. Referring to FIG. 2, each operating system has a fixed memory area 210, 220. As shown in FIG. 2, since each operating system has a fixed memory area, there is a problem that although there is a room in the memory area 210 of one operating system, another operating system whose working set size 221 uses all of the fixed memory area 220 lacks an amount of memory 222 necessary to operate.

Figure 3:
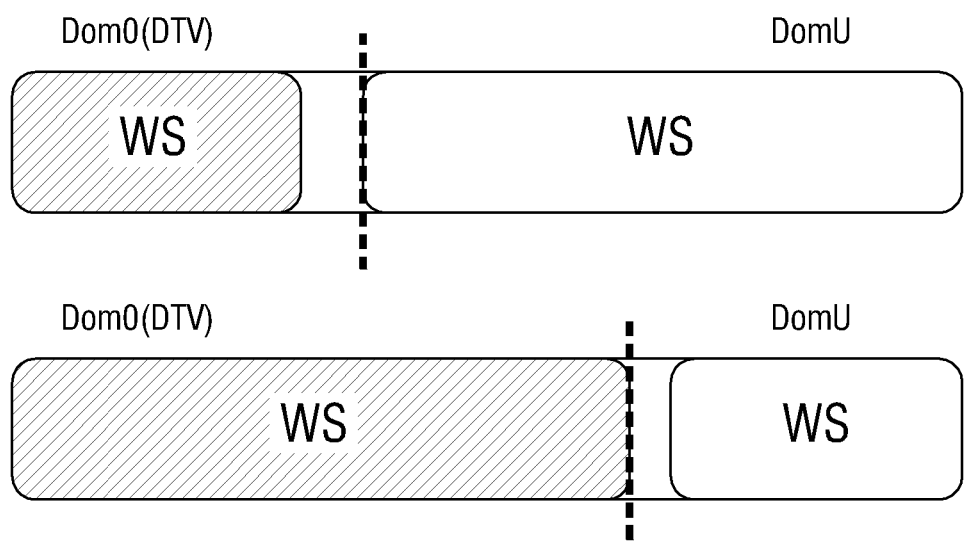

FIG. 3 illustrates an example in which dynamic memory allocation is applied. Referring to FIG. 3, each operating system has a memory area that is changeable based on the amount of memory required by each operating system. As shown in FIG. 3, each operating system is allocated a memory size which can be changed as much as required. However, since the dynamic memory allocation is performed regardless of the priority of the operating system, the first operating system may malfunction if the second operating system uses the memory excessively.

Figure 4:
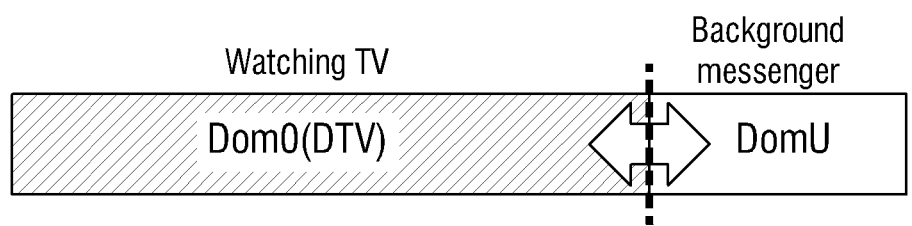
Figure 5:
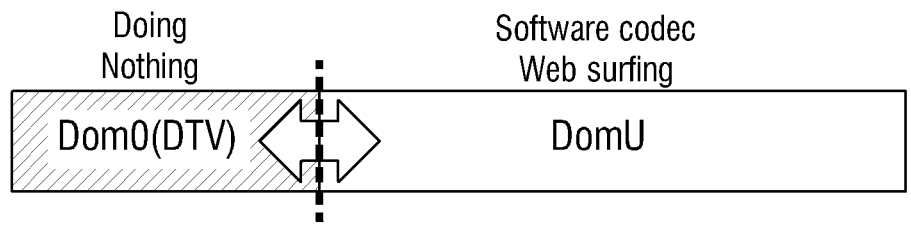
Figure 6:
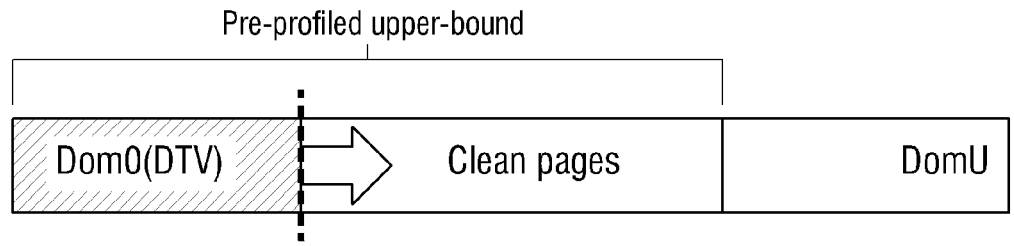

FIGS. 4 to 6 are views illustrating a memory managing method according to an exemplary embodiment.

Referring to FIGS. 4 and 5, if the first operating system requires much memory, the memory is allocated to the first operating system as much as required by the first operating system, and if the second operating system requires much memory, the memory is allocated to the second operating system as much as required by the second operating system. For example, in FIG. 4, the first operating system requires more memory for allowing the user to watch TV. Thus, more memory is allocated to the first operating system. On the other hand, in FIG. 5, the second operating system requires more memory to perform software codec and allow web surfing. Thus, the more memory is allocated to the second operating system. In other words, it can be seen that the plurality of operating systems share the limited memory efficiently.

Referring to FIG. 6, if the second operating system requires memory reallocation, a clean list area of the first operating system which has been managed is provided to the second operating system more efficiently. Although the entire clean list area of the first operating system is reallocated to the second operating system in FIG. 6, only a part of the clean list area may be reallocated to the second operating system. In other words, if the first operating system is being operated, only the clean list area that does not affect the operation of the first operating system may be reallocated to the second operating system.

Figure 7:
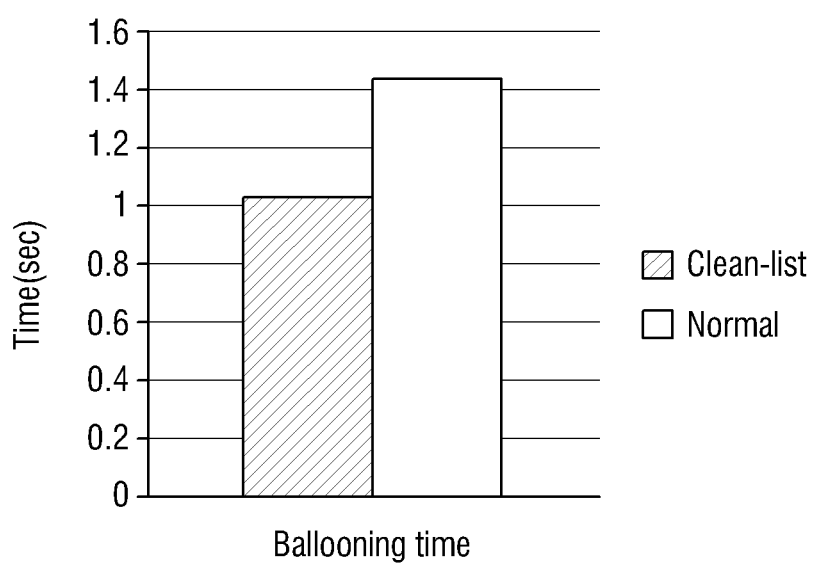
FIG. 7 is a graph comparing a time taken to allocate a memory if a retrievable memory area is periodically checked and a time taken to allocate a memory if a retrievable memory area is not periodically checked.

FIG. 7 is a view of a graph comparing a time taken to allocate a memory if a retrievable memory area is periodically checked and a time taken to allocate a memory if a clean list is used.

Referring to FIG. 7, if a clean list is prepared in advance as a result of checking a retrievable memory area periodically, it takes less time to allocate a memory than if the clean list is not prepared in advance.

Figure 8:
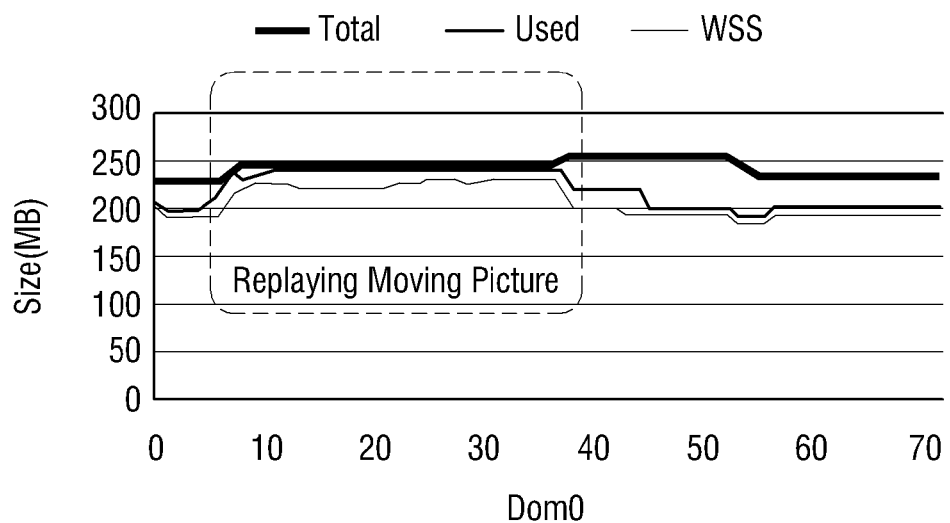
FIG. 8 is a view illustrating an example of an operation of allocating a memory according to an exemplary embodiment.
Figure 8:
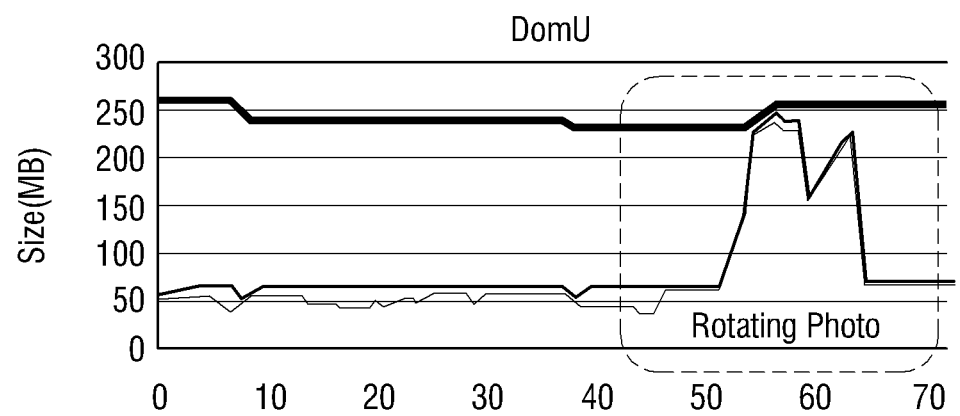

FIG. 8 is a view illustrating an example of a method for allocating a memory according to an exemplary embodiment. Specifically, FIG. 8 illustrates an amount of memory allocated to each operating system and a WSS if the second operating system performs a 'photo rotating operation' that requires memory abruptly, while the first operating system is replaying a motion picture.

Referring to FIG. 8, a necessary amount of memory for the second operating system to rotate a photo is increased abruptly. Even if the necessary amount of memory is increased abruptly, the memory of the first operating system is reallocated to the second operating system so that an application can be executed without a delay. Also, during a process of guaranteeing the memory, a delay in operating the first operating system is not incurred.

Figure 9:
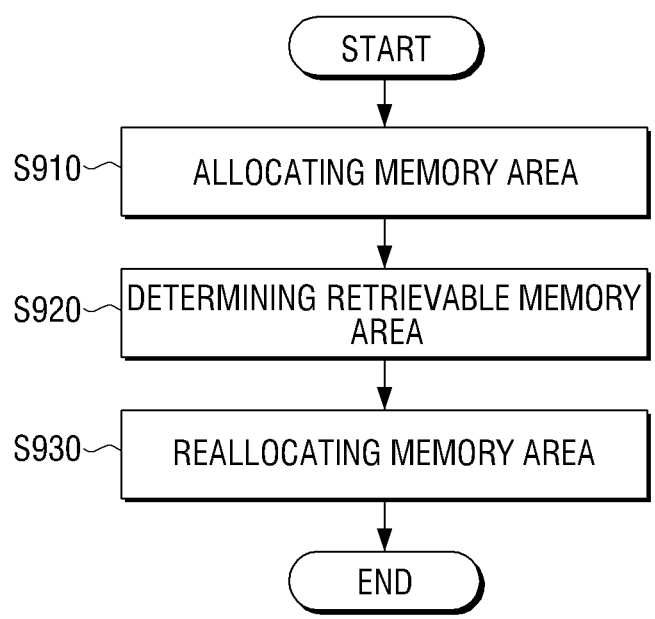
FIG. 9 is a flowchart illustrating a memory managing method according to an exemplary embodiment.

FIG. 9 is a flowchart illustrating a memory managing method according to an exemplary embodiment.

Referring to FIG. 9, a plurality of memory areas are allocated to a plurality of operating systems (S910). Specifically, a memory area is allocated to each of the operating system at a time when the plurality of operating systems should operate according to an initial operation, a user's manipulation, or occurrence of an event. The same memory area may be allocated to each operating system or a different memory area may be allocated to each operating system according to a predetermined size or a predetermined algorithm.

A retrievable memory area for each of the plurality of allocated memory areas is periodically checked (S920). Specifically, a size of a memory used by each operating system in the allocated memory area is checked and a retrievable memory area is determined based on the checked memory size, periodically. The determined retrievable memory area may be managed as a clean list.

If it is necessary to reallocate the memory area, at least part of the retrievable memory area is reallocated (S930). Specifically, a change in the memory size is checked on a real time basis, and, if the memory area needs to be reallocated because of the change in the memory size required in one operating system, at least part of the retrievable memory area is reallocated. The operation of reallocating the memory area will be explained in detail with reference to FIG. 10.

Figure 10:
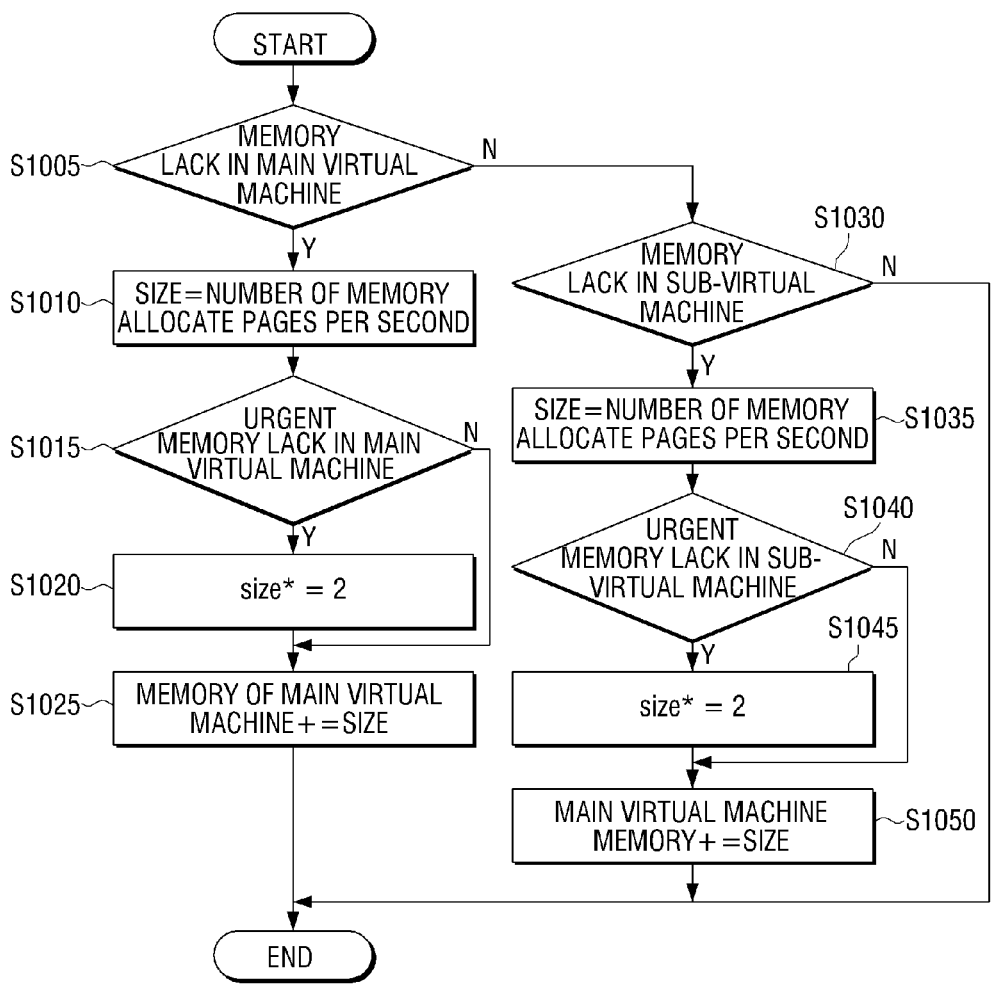
FIG. 10 is a flowchart illustrating the operation of reallocating the memory of FIG. 9 in detail.

FIG. 10 is a view illustrating the operation of reallocating the memory area of FIG. 9 in detail.

Referring to FIG. 10, it is determined whether the first operating system (main virtual machine) lacks a memory (S1005). Specifically, it is determined whether the first operating system lacks a memory by checking the WSS of the first operating system.

If the first operating system lacks a memory, it is determined whether the lack of the memory in the first operating system is urgent or not (S1015), and a size of a memory to be reallocated to the first operating system is calculated (S1010, S1020, S1025). Specifically, if the memory needs to be reallocated urgently, the same size memory as that which is currently allocated to the first operating system is reallocated to the first operating system. If the memory does not need to be reallocated urgently, an amount of memory equal to the number of pages required per one second is reallocated to the first operating system.

If the second operating system lacks memory (S1030), it is determined whether the lack of the memory in the second operating system is urgent or not (S1040), and a size of a memory to be reallocated to the second operating system is calculated (S1035, S1045, S1050) in a similar manner to that described for the first operating system. The additional memory size to be reallocated to the second operating system is determined so as not to affect the operation of the first operating system.

In the above embodiment, the plurality of operating systems are limited to the first operating system for providing the basic service and the second operating system for providing the additional service, but this should not be considered as limiting. Three or more operating systems may be used in order to provide the basic service and a plurality of additional services.

According to the memory managing method of the exemplary embodiment described above, by checking and guaranteeing the re-allocable (retrievable) memory area prior to the time when the memory needs to be reallocated, the memory can be reallocated more efficiently. Also, since the priority is given to the first operating system and then the memory is reallocated, the performance of the first operating system does not deteriorate and the first operating system is prevented from malfunction in providing service even when the second operating system performs a job that requires much memory. The memory managing method of FIGS. 9 and 10 may be executed in the broadcast receiving apparatus of FIG. 1 or may be executed in any other type of broadcast receiving apparatus.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for managing a memory of a broadcast receiving apparatus, the method comprising:

allocating a first memory area to a first operating system for providing a first service, and a second memory area to a second operating system for providing a second service;

determining a first retrievable memory area that is re-allocable to the second operating system among the first memory area; and reallocating at least part of the determined first retrievable memory area to the second operating system, wherein the first operating system is used for providing a basic service of the broadcast receiving apparatus and the second operating system is used for providing an additional service provided by the broadcast receiving apparatus, wherein the determining comprises periodically determining a second retrievable memory from the second memory area, and wherein the reallocating comprises reallocating at least part of the second retrievable memory area to the first operating system.

2. The method as claimed in claim 1, wherein the determining comprises checking an amount of memory that is used by the first operating system in the first memory area, and determining the first retrievable memory area based on the determined amount of memory used by the first operating system.

3. The method as claimed in claim 2, wherein the first retrievable memory area equals a difference between the first memory area and the amount of memory that is used by the first operating system.

4. The method as claimed in claim 2, wherein the reallocating comprises reallocating at least part of the first retrievable memory area based on a change in an amount of memory used by the second operating system.

5. The method as claimed in claim 1, wherein the determining comprises managing the first retrievable memory area as a clean list.

6. The method as claimed in claim 1, wherein the second retrievable memory area equals a difference between the second memory area and an amount of memory that is used by the second operating system, and wherein the reallocating comprises reallocating at least part of the second retrievable memory area based on a change in an amount of memory used by the first operating system.

7. The method as claimed in claim 1, wherein the reallocating comprises reallocating a part of the second retrievable memory area to the first operating system that corresponds to a size of the first memory area.

8. A method for managing a memory of a broadcast receiving apparatus, the method comprising:

allocating a first memory area to a first operating system for providing a first service, and a second memory area to a second operating system for providing a second service;

determining a first retrievable memory area that is re-allocable to the second operating system among the first memory area; and reallocating at least part of the determined first retrievable memory area to the second operating system, wherein the first operating system is used for providing a basic service of the broadcast receiving apparatus and the second operating system is used for providing an additional service provided by the broadcast receiving apparatus, and wherein the reallocating comprises reallocating the second retrievable memory area by giving priority to the first memory area over the second memory area.

9. A broadcast receiving apparatus comprising:

a storage unit which includes a first memory area allocated to a first operating system for providing a first service, and a second memory area allocated to a second operating system for providing a second service;

a determination unit which determines a first retrievable memory area that is re-allocable to the second operating system among the first memory area; and a controller which reallocates at least part of the first retrievable memory area to the second operating system, wherein the first operating system is used for providing a basic service of the broadcast receiving apparatus and the second operating system is used for providing an additional service provided by the broadcast receiving apparatus, wherein the determination unit periodically determines a second retrievable memory area from the second memory area, and wherein the controller reallocates at least part of the second retrievable memory area to the first operating system.

10. The broadcast receiving apparatus as claimed in claim 9, wherein the determination unit checks an amount of memory that is used by the first operating system in the first memory area, and determines the first retrievable memory area based on the determined amount of memory used by the first operating system.

11. The broadcast receiving apparatus as claimed in claim 10, wherein the first retrievable memory area equals a difference between the first memory area and the amount of memory that is used by the first operating system.

12. The broadcast receiving apparatus as claimed in claim 10, wherein the controller reallocates at least part of the first retrievable memory area based on a change in an amount of memory used by the second operating system.

13. The broadcast receiving apparatus as claimed in claim 9, wherein the determination unit manages the first retrievable memory area as a clean list.

14. The broadcast receiving apparatus as claimed in claim 9, wherein the second retrievable memory area equals a difference between the second memory area and an amount of memory that is used by the second operating system, and wherein the controller reallocates at least part of the second retrievable memory area based on a change in an amount of memory used by the first operating system.

15. The broadcast receiving apparatus as claimed in claim 9, wherein the controller reallocates a part of the second retrievable memory area to the first operating system that corresponds to a size of the first memory area.

16. A broadcast receiving apparatus comprising:

a storage unit which includes a first memory area allocated to a first operating system for providing a first service, and a second memory area allocated to a second operating system for providing a second service;

a determination unit which determines a first retrievable memory area that is re-allocable to the second operating system among the first memory area; and a controller which reallocates at least part of the first retrievable memory area to the second operating system, wherein the first operating system is used for providing a basic service of the broadcast receiving apparatus and the second operating system is used for providing an additional service provided by the broadcast receiving apparatus, and wherein the controller reallocates the second retrievable memory area by giving priority to the first memory area over the second memory area.

* * * * *